United States Patent
Herda et al.

(10) Patent No.: US 8,284,808 B2
(45) Date of Patent: Oct. 9, 2012

(54) DEVICE FOR GENERATION OF TUNABLE LIGHT PULSES

(75) Inventors: Robert Herda, Munich (DE); Armin Zach, Munich (DE); Frank Lison, Gauting (DE)

(73) Assignee: TOPTICA Photonics AG, Graefelfing (DE)

( * ) Notice: Subject to any disclaimer, the term of this patent is extended or adjusted under 35 U.S.C. 154(b) by 0 days.

(21) Appl. No.: 12/590,752

(22) Filed: Nov. 13, 2009

(65) Prior Publication Data

US 2010/0135338 A1 Jun. 3, 2010

Related U.S. Application Data

(60) Provisional application No. 61/208,397, filed on Feb. 24, 2009.

(30) Foreign Application Priority Data

Nov. 15, 2008 (EP) ..................................... 08019983

(51) Int. Cl.
*H01S 3/10* (2006.01)

(52) U.S. Cl. .................... 372/21; 372/6; 372/22; 372/25

(58) Field of Classification Search ................. 372/6, 21
See application file for complete search history.

(56) References Cited

U.S. PATENT DOCUMENTS

| 5,867,305 | A | * | 2/1999 | Waarts et al. | 359/337.12 |
|---|---|---|---|---|---|
| 6,813,429 | B2 | * | 11/2004 | Price et al. | 385/125 |
| 6,990,270 | B2 | * | 1/2006 | Nicholson | 385/27 |
| 7,202,993 | B2 | | 4/2007 | Tauser et al. | |
| 2002/0101898 | A1 | * | 8/2002 | Lo et al. | 372/46 |
| 2005/0238070 | A1 | * | 10/2005 | Imeshev et al. | 372/21 |

OTHER PUBLICATIONS

J. Chou et al., "Triggerable Continuum Source for Single-shot Ultra-fast Applications," LEOS 2006, pp. 806-807, Oct. 2006.*

* cited by examiner

*Primary Examiner* — Patrick Stafford
*Assistant Examiner* — Xinning Niu
(74) *Attorney, Agent, or Firm* — Collard & Roe, P.C.

(57) ABSTRACT

A device for generating light pulses includes a seed laser source for generating input light pulses. An optical pre-amplifier having variable gain receives the input light pulses from the seed laser source. An optical power amplifier receives the light pulses from the optical pre-amplifier and amplifies and compresses the received light pulses. The light pulses are compressed in the optical power amplifier in such a manner that the pulse duration of the output light pulses of the optical power amplifier is tunable via adjusting the gain of the optical pre-amplifier. Wavelength-tunable light pulses are obtained by supplying the output light pulses of the optical power amplifier to a highly non-linear optical fiber.

12 Claims, 3 Drawing Sheets

DEVICE FOR GENERATION OF TUNABLE LIGHT PULSES

CROSS REFERENCE TO RELATED APPLICATIONS

Applicants claim priority under 35 U.S.C. §119 of U.S. Provisional Patent Application Ser. No. 61/208,397 filed on Feb. 24, 2009 and European Patent Application No. 08019983.9 filed Nov. 15, 2008.

BACKGROUND OF THE INVENTION

1. Field of the Invention

The invention relates to a device for generating light pulses. The device comprises a seed laser source and an optical power amplifier which amplifies the light pulses generated by the seed laser source.

2. Description of the Related Art

Many applications require a tunable visible ultrafast source of light pulses. Fiber technology enables efficient maintenance free systems that generate femtosecond pulses (i.e. light pulses with a pulse duration between 1 fs and 1 ps) with nanojoule energies in the near infrared at a wavelength of 1.56 µm. Such a system can be used as a seed laser source for generating light pulses in a device of the type mentioned above.

The radiation of the seed laser source can be converted into wavelength-tunable radiation in the infrared spectral region using third-order non-linear processes in highly non-linear fibers (HNLF). The tunabilty of the near infrared radiation is achieved by varying the duration of the pulses incident onto the HNLF in a targeted manner. This radiation can be further converted, for example by means of second harmonic generation, to wavelength-tunable radiation in the visible spectral region.

For example from U.S. Pat. No. 7,202,993 B2 a system for the generation of wavelength-tunable light pulses is known. The known system comprises a femtosecond fiber laser as a seed laser source. The light pulses generated by means of the seed laser source are pre-stretched in an anomalous dispersion fiber. Thereafter, the light pulses broaden spectrally and temporally in an Erbium-doped fiber amplifier having normal dispersion. The laser beam leaving the fiber amplifier is collimated, and the chirped light pulses are compressed in a bulk silicon compressor to a pulse duration of about 100 fs. Thereafter, the light pulses are coupled into a HNLF. Light pulses tunable between 950 nm and 1400 nm are generated by exploiting the process of non-solitonic radiation during the soliton fission process in the HNLF. The frequency shift of the non-solitonic radiation to shorter wavelength is determined by the phase matching condition which depends on the parameters of the HNLF and on the peak power of the light pulses initially formed in the HNLF. Tuning is achieved by means of changing the peak power incident onto the HNLF. In the known system, the material passage of the silicon compression prisms is changed for this purpose. In this way, a chirp of the light pulses is generated which renders the peak power tunable in a targeted manner. By this approach in combination with a suitable HNLF, the non-solitonic radiation can be tuned between 1400 nm and 950 nm. However, a disadvantage of the known system is the necessity to include bulk elements and large free space sections containing the silicon prisms. Moreover, a motorized translation stage is required in order to change the prism separation for automated detuning. The arrangement of the silicon compression prisms causes instabilities due to temperature fluctuations, slows down the tuning speed and causes undesirable coupling losses.

SUMMARY OF THE INVENTION

From the foregoing it is readily appreciated that there is a need for an improved device for generating light pulses. It is consequently an object of the invention to provide a device which has a simplified design and which operates more reliably.

In accordance with the invention, a device for generating light pulses is disclosed. The device comprises:
  a seed laser source for generating input light pulses;
  a tuning element, which receives the input light pulses from the seed laser and which tunably adjusts the energy of the received light pulses;
  an optical power amplifier which receives the light pulses from the tuning element and which amplifies and compresses the received light pulses.

The gist of the invention is to use soliton-effect compression in the optical power amplifier, wherein the pulse duration of the light pulses is varied by adjusting the energy of the light pulses supplied to the optical power amplifier. For adjusting the energy of the input light pulses generated by the seed laser source no bulk optical elements, no large free space sections within the optical path, and no motorized translation stages are required.

According to a preferred embodiment of the invention, the output light pulses of the optical power amplifier are fed into a HNLF. In this way, the radiation at the output of the optical power amplifier is converted to wavelength-tunable radiation by using the non-linear processes in the HNLF. The optical spectrum of the light pulses leaving the HNLF is sensitively dependent on the duration of the output light pulses of the optical power amplifier. In this way, the desired wavelength tunability of the light pulses is obtained according to the invention. The wavelength of the light pulses at the output of the HNLF can be varied by adjusting the energy of the light pulses (i.e. the pulse power) by means of the tuning element. The produced light pulses can be tuned to the desired wavelength in a convenient and simple manner simply by adjusting the energy of the light pulses emitted by the seed laser source. Different techniques are commonly known in the art for adjusting the energy of the light pulses. It is an advantage of the invention that such techniques do not require bulk optical components, free space sections or motorized components.

According to another preferred embodiment of the invention, the output light pulses of the HNLF are fed into an optical frequency converter. In case the seed laser source of the device of the invention generates light pulses in the infrared spectral region, the light pulses produced at the output of the HNLF are correspondingly wavelength-tunable in the near infrared/infrared spectral range. The light pulses at the output of the HNLF have a sufficiently high pulse energy (on the order of nanojoules), so that the wavelength of the light pulses can be converted to the visible spectral range by using non-linear optical effects, by means of a frequency converter of a known type. In case light pulses between 900 and 1500 nm are produced a the output of the HNLF, light pulses in the visible spectral range between 450 nm and 750 nm can be generated by means of second harmonic generation (SHG), i.e. by means of a frequency doubler of a usual type. For example, commercially available SHG crystals or periodically poled crystals or suitable waveguide structures can be used as frequency doublers.

In a practical embodiment of the invention, the optical power amplifier is a first optically pumped fiber amplifier having anomalous dispersion. As mentioned before, the gist of the invention is to compress the light pulses emitted by the seed laser source by means of soliton effect compression in the optical power amplifier. Preferably, the optical power amplifier is a fiber amplifier having an optically pumped Large Mode Area (LMA) fiber. The pulse duration of the output light pulses of the optical power amplifier is adjustable by tuning the energy, e.g. the pulse power incident on the LMA power amplifier. In the LMA power amplifier, the pulse energy is increased. Moreover, the chirp of the input light pulses is compensated by the anomalous dispersion of the LMA fiber. For a given input light pulse and fiber gain, the optical power amplifier provides perfect compression only for a specific length of the fiber. A too short fiber leads to incomplete compression, whereas a too long fiber causes a pulse split-up due to Raman shifting. This fact is exploited by the invention by adjusting the energy of the input light pulses incident on the LMA power amplifier. Different pulse energies of the input light pulses result in light pulses having different durations at the output of the optical power amplifier.

According to yet another preferred embodiment, the tuning element of the device of the invention is an optical pre-amplifier having variable gain. The optical pre-amplifier may be a second optically pumped fiber amplifier. For the purpose of tunably adjusting the energy of the input light pulses generated by the seed laser source, the gain of the optical pre-amplifier can be varied, for example by adjusting the pump energy of the second fiber-amplifier. To this end, the supply current of a pump diode of the second fiber amplifier can be varied.

In the afore-described preferred embodiment of the invention, the optical pre-amplifier is combined with the optical power amplifier having anomalous dispersion. This concept enables the conversion of a variation in pulse energy into a variation in pulse duration in a particularly practical manner. The power level of the light pulses at the output of the optical power amplifier is practically independent from the pre-amplifier current, i.e. the energy of the light pulses supplied to the optical power amplifier. This is because the optical power amplifier is strongly saturated.

According to the invention, as mentioned before, soliton-effect compression in the optical power amplifier is made use of to adjust the pulse duration of the light pulses at the output of the optical power amplifier simply by changing the gain of the pre-amplifier, for example by varying the supply current of the pump diode of the pre-amplifier. Hence, the conventional wavelength-tuning by a motorized stage is replaced according to the invention by adjusting a current.

It is an essential advantage of the device according to the invention that it can be realized as an 'all-fiber' solution. The different functional components of the device according to the invention can be realized as fiber sections connected to each other by means of splice connections, either directly or via separate connecting fiber sections. As mentioned above, the seed laser source can be a fiber laser spliced to the optical pre-amplifier, which can be realized as a fiber amplifier. Moreover, the fiber pre-amplifier can be spliced to the optical power amplifier, which can also be realized as a fiber amplifier. Finally, the optical power amplifier can be spliced to the HNLF. The result is an all-fiber device generating pulse duration-adjustable and/or wavelength-tunable light pulses in a purely electronical manner, for example by adjusting the power of a pump diode used for optically pumping the optical pre-amplifier.

BRIEF DESCRIPTION OF THE DRAWINGS

The enclosed drawings disclose preferred embodiments of the present invention. It should be understood, however, that the drawings are designed for the purpose of illustration only and not as a definition of the limits of the invention. In the drawings.

DETAILED DESCRIPTION OF PREFERRED EMBODIMENTS

Figure 1:
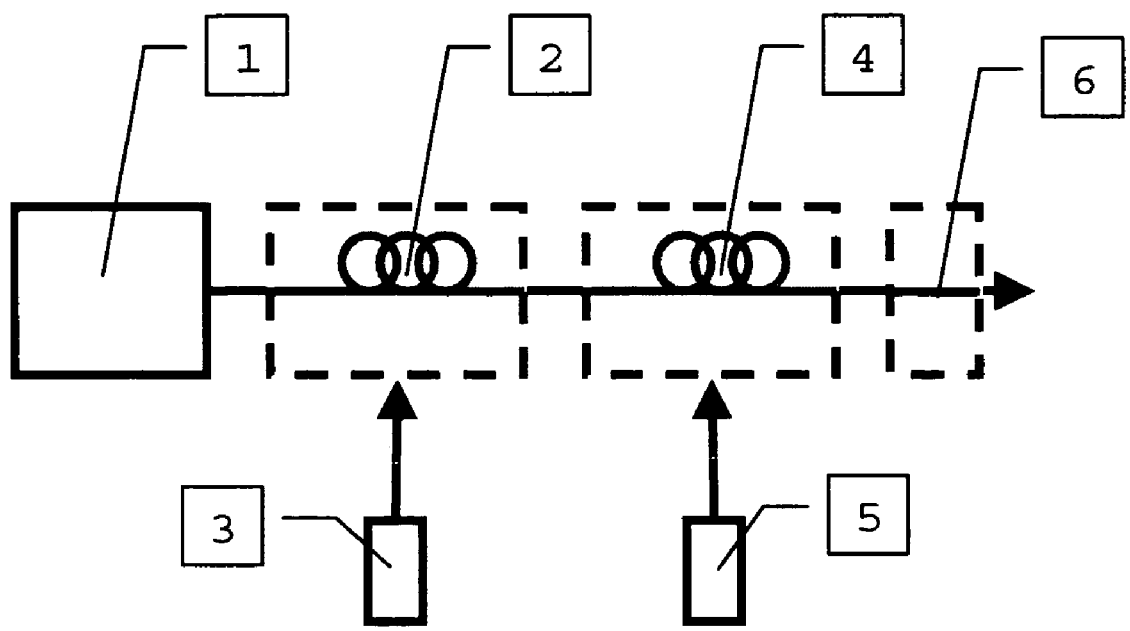
FIG. 1 shows a representation of a first embodiment of the device according to the invention as a block diagram.
Figure 4:
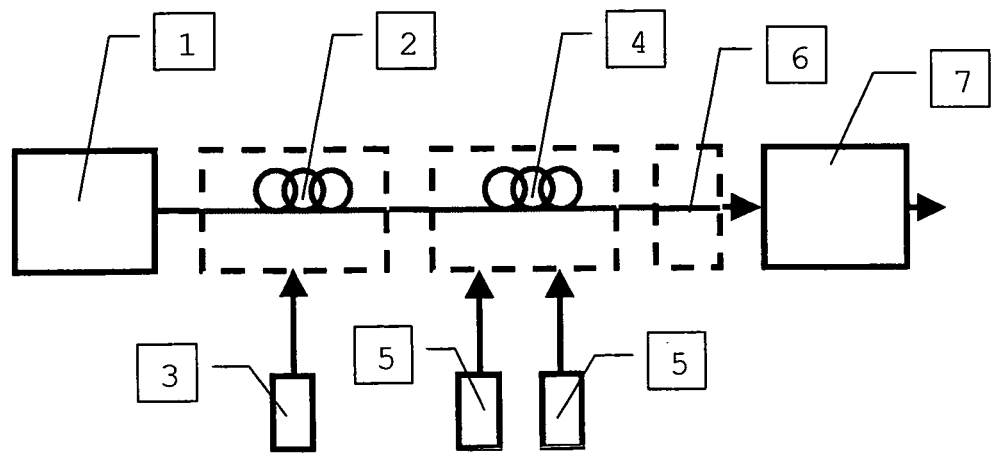
FIG. 4 illustrates a second embodiment of the device according to the invention.
Figure 5:
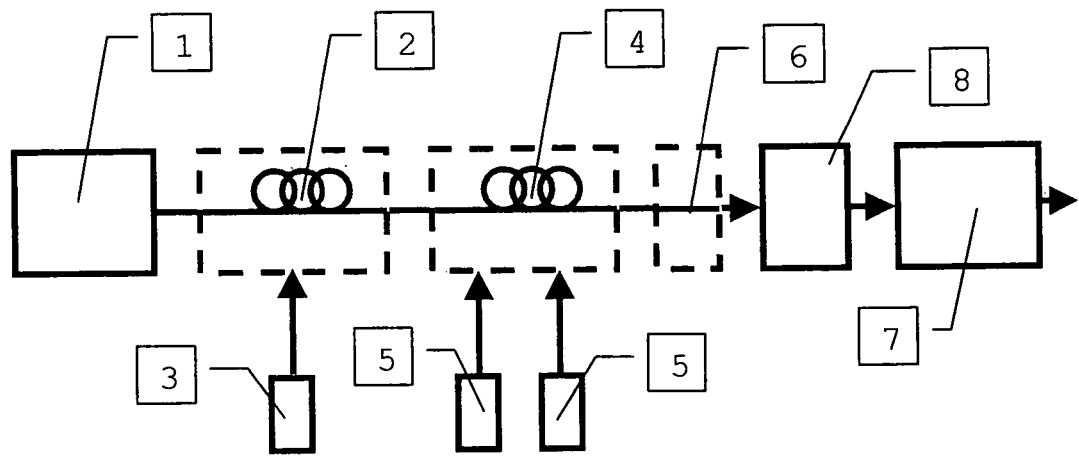
FIG. 5 illustrates a third embodiment of the device according to the invention.

Turning now in detail to the drawings, FIGS. 1, 4 and 5 show embodiments of the device of the invention, which comprises a seed laser source 1. The seed laser source 1 is a fiber-based pulsed laser light source, which emits femtosecond light pulses. The seed laser source 1 can be a commercially available pulsed fiber laser. The use of a free-beam laser as the seed laser source 1 is also feasible, however. The seed laser source 1 generates input light pulses at a wavelength of 1.56 μm, i.e. in the infrared spectral range, at a repetition rate of, for example, 40 MHz. The pulse duration of the input light pulses generated by the seed laser source 1, is, for example, 500 fs.

The input light pulses are received by an optical pre-amplifier, which is connected to the seed laser source 1 via a splice connection. In the depicted embodiments, the optical pre-amplifier is an optically pumped fiber amplifier comprising an Erbium-doped fiber section 2 and a pump diode 3, which emits pump light at a wavelength of 980 nm. The Erbium-doped pre-amplifier fiber 2 can have a mode field diameter of, for example, 8.8 μm and a length of 70 cm. The fiber-amplifier 2, 3 constitutes a tuning element within the meaning of the invention, which tunably adjusts the energy of the light pulses received from the seed laser source 1. After the pre-amplifier 2, 3 the pulse energy is in the range between 150 pJ and 250 pJ, depending on the gain of the pre-amplifier 2, 3.

In the depicted embodiments, the device further comprises an optical power amplifier, which receives the light pulses from the pre-amplifier 2, 3. The optical power amplifier comprises an optically pumped LMA fiber 4, which is connected via a splice connection to the pre-amplifier 2, 3. The fiber 4 has a mode field diameter of, for example, 20 μm and is pumped by means of one or more high power single spatial mode pump lasers 5 emitting at 980 nm. The LMA fiber 4 has anomalous dispersion. The optical power amplifier 4, 5 compresses the light pulses by soliton effect compression in such a manner that the pulse duration of the output light pulses of the optical power amplifier 4, 5 is tunable via adjusting the gain of the pre-amplifier 2, 3. In order to achieve the adjustability of the amplifier gain, the supply current of the pump diode 3 is variable.

In order to generate wavelength-tunable radiation, the output light pulses of the LMA fiber 4 are coupled (via splice connection) into a short section (for example 2 cm) of a HNLF 6. The HNLF 6 has a particularly small core diameter of less than 5 μm. Due to the non-linear optical processes occurring in the HNLF 6, light pulses, which are tunable in the infrared spectral range, are obtained at the output of the HNLF 6.

Figure 2:
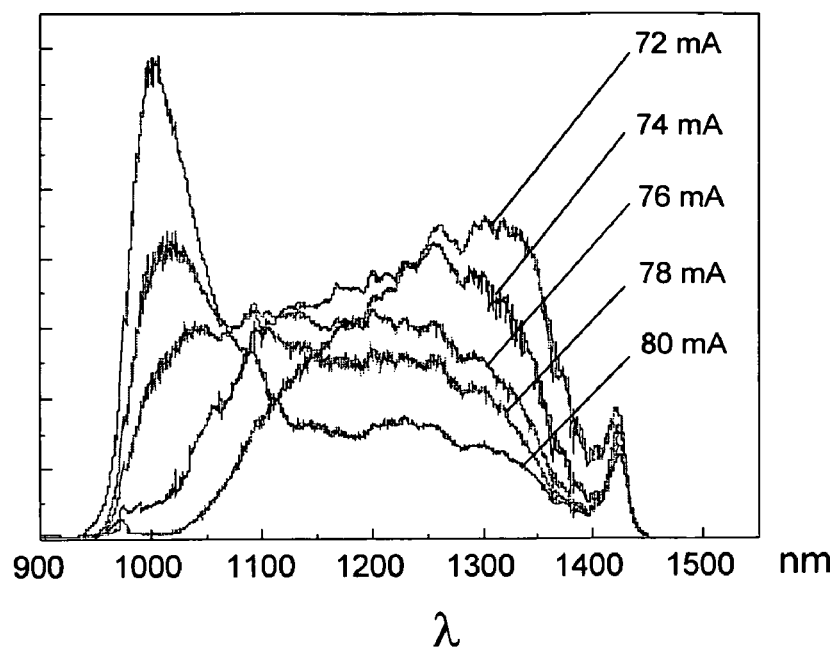
FIG. 2 shows a diagram illustrating the tunability of the light pulses according to the invention.

FIG. 2 shows spectra of the light pulses at the output of the HNLF 6 for different supply currents of the pump diode 3. As can be seen in FIG. 2, the peak of the spectrum of the light pulses can be shifted between 1300 nm and 1020 nm for different gain settings of the optical pre-amplifier 2, 3. The frequency shift is caused by the difference in pulse duration of the light pulses at the output of the LMA fiber 4. As explained above, the basic idea of the invention is to compress the light pulses emitted by the seed laser source 1 by means of soliton effect compression in the LMA fiber 4 and to adjust the pulse duration at the output of the LMA fiber 4 by tuning the pulse power incident on the LMA fiber 4. In the depicted embodiments this is achieved by adjusting the current of the pump diode 3 of pre-amplifier fiber 2. The variable pulse energy at the input of the LMA fiber 4 is translated into a variable pulse duration at the output of the LMA fiber 4. The difference in pulse duration, in turn, is translated into a shift of the wavelength of the light pulses at the output of the HNLF 6. In the depicted embodiments, the wavelength of the light pulses at the output of the HNLF 6 can be shifted smoothly between 1000 nm and 1350 nm without a pronounced spectral gap within the tuning range.

For the purpose of generating wavelength-tunable light pulses in the visible spectral range, the output light pulses of the HNLF 6 are frequency converted by means of an optical frequency converter 7 (FIGS. 4 and 5). By using a SHG crystal as a frequency converter 7, light pulses that are tunable between 500 nm and 675 nm are obtained. The tuning is achieved by adjusting the current of the pump diode 3 and by correspondingly adjusting the used section of the SHG crystal of the frequency converter 7. For this purpose, the SHG crystal may be a periodically poled crystal having a fan-shaped design of a per se known type. Optionally, the light pulses at the output of the HNLF 6 are re-compressed by means of a SF10 prism pair 8 prior to frequency conversion (FIG. 5).

Figure 3:
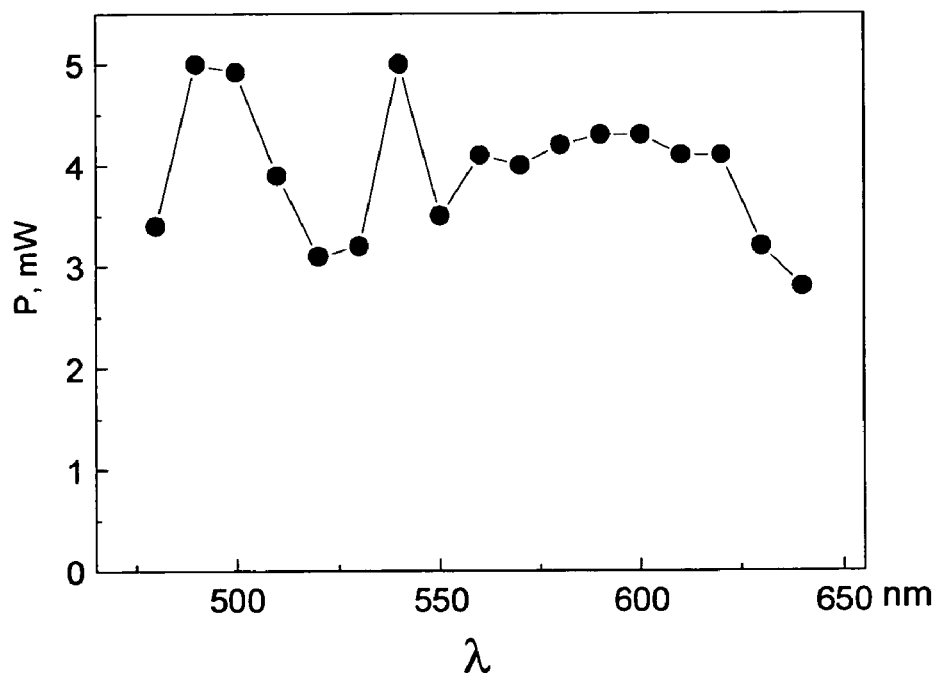
FIG. 3 shows the power of the light pulses converted into the visible spectral range.

FIG. 3 shows the obtained average power (in mW) at the output of the frequency converter 7 for different wavelengths in the visible spectral range.

Although only a few embodiments have been shown or described, it is to be understood that many changes and modifications may be made thereunto without departing from the spirit and scope of the invention.

What is claimed is:

1. A device for generating light pulses, comprising:
a seed laser source for generating input light pulses;
a tuning element, which receives the input light pulses from the seed laser source and which tunably adjusts the energy of the received light pulses; and
an optical power amplifier which receives the light pulses from the tuning element and which amplifies and compresses the received light pulses, wherein the optical power amplifier compresses the light pulses by soliton effect compression in such a manner that the pulse duration of the output light pulses of the optical power amplifier is tunable via adjusting the energy of the light pulses by means of the tuning element,
a highly non linear optical fiber, wherein the output light pulses of the optical power amplifier are fed into the highly non-linear optical fiber;
wherein said tuning element is configured to adjust the power level of the light pulses at the input of the optical power amplifier, wherein the power level of the light pulses at the output of the optical power amplifier is practically independent from the power level of the light pulses at the input of the optical power amplifier, and wherein said tuning element is configured to vary the wavelength of the light pulses at the output of the highly non-linear optical fiber by adjusting the energy of the light pulses.

2. The device of claim 1, wherein the output light pulses of the highly non-linear optical fiber are fed into an optical frequency converter.

3. The device of claim 2, wherein the optical frequency converter is a second harmonic generator.

4. The device of claim 2, wherein the input light pulses are in the infrared spectral range such that the output light pulses of the optical frequency converter are in the visible spectral range.

5. The device of claim 1, wherein the input light pulses are femtosecond pulses.

6. The device of claim 1, wherein the optical power amplifier is a first optically pumped fiber amplifier having anomalous dispersion.

7. The device of claim 1, wherein the optical power amplifier comprises a large mode area fiber.

8. The device of claim 1, wherein the tuning element is an optical pre-amplifier having variable gain.

9. The device of claim 8, wherein the optical pre-amplifier is a second optically pumped fiber amplifier.

10. The device of claim 9, wherein the gain of the optical pre-amplifier is varied by adjusting the pump energy of the second fiber-amplifier.

11. The device of claim 10, wherein the pump energy is adjusted by varying the supply current of a pump diode of the second fiber-amplifier.

12. The device of claim 1, wherein the seed laser source, the optical pre-amplifier, and the optical power amplifier are connected via splice connections of optical fibers.

* * * * *